Patented Sept. 30, 1941

2,257,091

UNITED STATES PATENT OFFICE 2,257,091

SOLUBILIZATION OF DIAZOIMINO COMPOUNDS

Wallace A. Erickson, Chicago, Ill., assignor to E. I. du Pont de Nemours & Company, Wilmington, Del., a corporation of Delaware No Drawing. Application February 8, 1940, Serial No. 317,897

4 Claims. (Cl. 260—140)

This invention relates to intermediates for dyes, particularly to water-soluble diazoimino compounds which are products of reaction with ethylene oxide, and which may be used in the preparation of dyes.

The reaction of diazoamino or diazoimino compounds with ethylene oxide as herein described is a novel reaction, but some of the compounds which can be produced by it have been produced by different methods, for instance, by that which is disclosed in Blackshaw et al. No. 2,132,456, of Ocotober 11, 1938, wherein tetra- and hexa-ethanoxy amines are obtained by condensing four or six molecular proportions, respectively, of ethylene oxide with one molecular proportion of 4-toluene-sulfonamide, and by subsequently hydrolyzing the condensation product thus obtained with 60% aqueous sulfuric acid. Consequently, the compounds produced by this process will be claimed herein only to the extent that they are new, or that they differ from the same products as produced by other processes.

This invention has for its objects the preparation of relatively water-soluble diazoimino compounds, the solubilization of relatively water-insoluble diazoimino compounds, the production of new compounds, and the use thereof in the art of dyeing.

These objects of the invention are accomplished, generally speaking, by reacting the di-azoimino compound with ethylene oxide, and by employing the products of the reaction in the dyeing.

Diazoimino compounds may be prepared very readily by reacting a diazotized primary aryl-amine with a compound such as diethanol amine, as described in Kern No. 2,078,387, April 27, 1937. Those diazoimino compounds are cheap, readily prepared, easily isolated, and would be of value in the dye industry except that they are essentially insoluble in water. Many of them, for instance those which are made from dianisidine, 2,5-dichloraniline, and 5-nitro-2-amino-anisole, have low solubilities even in solvents such as alcohol, acetone and ethylene-glycol-mono-ethyl ether.

I have found that when a diazoimino compound which is by nature essentially insoluble in water is reacted with ethylene oxide under pressure, a product is obtained of markedly greater solubility in water and alcohol. This reaction may be carried out conveniently in a bomb or an agitated autoclave, since pressures as high as 250 lbs. per square inch are frequently developed. The conditions of the reaction must be chosen to avoid decomposing the diazoimino compound; I find that the reaction proceeds well between 80° C. and 100° C. I have also found it advisable to add enough caustic alkali to the reaction mass to neutralize any acids which may be present. The ratio of the reactants is not critical, but I prefer to use about four mols of ethylene oxide to each mol of diethanol amine present in the diazoimino compound. Smaller amounts of ethylene oxide give products which tend to crystallize on standing and which have poorer solubility. The length of time the reaction is run is not important, but as a rule the reaction is considered to be over after about two hours, since longer heating has no particular influence on the nature of the product.

The following examples are illustrative but not limitative of the invention.

Example I

One mol of dianisidine was tetrazotized in the usual manner and the diazo solution slowly run into an aqueous solution of diethanolamine containing sufficient sodium carbonate to keep the mixture alkaline to phenol-phthalein at all times. A yellowish brown product precipitated, was collected on a filter and washed well with cold water and dried. This product was insoluble in water and difficultly soluble even in boiling alcohol.

One-tenth of a mol of the product, 47.6 grams, was placed in a 200 cc. steel bomb and two drops of 2N sodium hydroxide added. The bomb then was chilled by placing in ice, and eight-tenths of a mol of ethylene oxide (40 cc. at the boiling point) was added. The bomb was sealed and was held at 80° C. for eight hours. The product thus obtained was a deep red-colored syrup, weighed 77 grams, and was completely miscible with water and with alcohol. Acidification of the solution hydrolyzed the diazoimino compound to the di-anisidine tetrazo which then coupled readily with Naphthol AS to form a blue pigment.

A mixture of the above product with a coupling component was prepared, with the following composition:

| | Parts |
|---|---|
| Dianisidine ⇌ diethanolamine, reacted with ethylene oxide | 13.6 |
| Anilide of 2-hydroxy-3-naphthoic acid | 7.1 |
| 30% sodium hydroxide solution | 12.0 |
| Ethyl alcohol | 30.0 |
| Water | 37.3 |
| | 100.0 |

This solution was thickened in the usual manner with starch-tragacanth thickener and printed on muslin. When the dried print was aged with steam and acetic acid, a strong blue print was obtained.

Example II

Two-tenths of a mol, 56.8 grams, of the diazoimino compound from diazotized 5-nitro-2-amino-anisole and diethanolamine was heated at 100° C. for eight hours with two drops of 2N sodium hydroxide solution and eight-tenths of a mol of ethylene oxide, 40 cc. at the boiling point. The product was obtained as a deep red syrup weighing 91.5 grams and was completely miscible with water and with alcohol. When a solution of the product in water was acidified with hydrochloric acid, the diazoimino compound was cleaved and the resulting solution had all of the properties of the original diazo solution.

To 4 parts of an alcoholic solution of the solubilized diazoamino body (20% based on 5-nitro-2-amino-anisole) was added 4 parts of 12° Bé. hydrochloric acid. To this was added 19 parts of water, 70 parts of starch-tragacanth thickener and 3 parts of a 1:1 solution of sodium acetate. This paste was printed on cotton piece goods which was previously padded with the anilide of 2-hydroxy-3-naphthoic acid. The print was washed and soaped in the usual manner. A bright red print was obtained.

Example III

Two-tenths of a mol, 70 grams, of the diazoimino compound from diazotized 4-chloro-2-amino-toluene and methyl glucamine was heated at 100° C. for 8 hours with two drops of 2N sodium hydroxide solution and one mol (50 cc.) of ethylene oxide. The resulting product was completely miscible with alcohol and with water, whereas the original compound was soluble only to the extent of .18 gram per 100 grams of water at 20° C.

Example IV

Four-hundredths of a mol, 24 grams, of the tetrazoimino compound from tetrazotized dianisidine and N-(trimethylol-methyl)-ethanolamine was heated at 80° C. for eight hours in a steel bomb with 20 cc. ethylene oxide (at the boiling point) and two drops of 2N sodium hydroxide solution. The product was obtained as a deep red syrup weighing 41 grams, which was completely miscible with water and with alcohol. When a solution of the product was acidified with hydrochloric acid, the tetrazoimino compound was split to regenerate the active tetrazo of dianisidine. Before reaction with ethylene oxide, the tetrazoimino compound was insoluble in water or alcohol.

Other diazoimino compounds may be utilized in this reaction in a similar manner. For example, there may be used the diazoimino compounds derived from diethanolamine with 2,5-dichloraniline, 4-nitro-2-amino-anisole, 4-carbomethoxy-amino-2,5-diethoxy-aniline, 6-chlor-2-amino-toluene, and 4-chlor-2-amino-anisole. The extent of solubilization differs markedly among the compounds produced by the reaction. The following bases have been tetrazotized and coupled to diethanolamine, forming the insoluble tetrazoimino compounds. These were in turn reacted with ethylene oxide. In every case improved solubility resulted: 4,4'-diamino-diphenyl-ether, 4,4'-diamino-diphenyl-sulfide, 1,2-di(4'-amino-phenoxy-acetyl-amino)-ethane, 4(4'-amino-phenoxy-acetyl-amino)-aniline, 4,4'-diamino-diphenyl-amine, 4,4'-diamino-diphenyl-methane, N,N'-di(4-amino-phenyl)-urea, 1,3-di(4'-amino-phenoxy)-propane, 4(4'-amino-benzoyl-amino)-aniline, 4,4'-diamino-azobenzene, 2,2'-dichloro-tolidine.

The diazoimino or tetrazoimino compounds prepared from other alkylol amines may be utilized in this reaction similarly. For example, there may be used N,N-(trimethylol-methyl)-(2,3-dihydroxy-n-propyl)-amine, N-(1,1-dimethylol-ethyl)-ethanol-amine, N-ethanol-glucamine, N-(2,3-dihydroxy-n-propyl)-glucamine, N,N-(2,3-dihydroxy-n-propyl)-(trimethylol-methyl)-amine, di-(2,3-dihydroxy-n-propyl)-amine, N-(2,3-dihydroxy-n-propyl)-ethanol-amine, N-(trimethylol-methyl)-glucamine, diglucamine, and N-(1,1-dimethylol-ethyl)-glucamine.

In theory, the reaction of the hydroxy-bearing diazoimino compounds with ethylene oxide results in the formation of a number of compounds, but the reaction may be indicated for convenience thus:

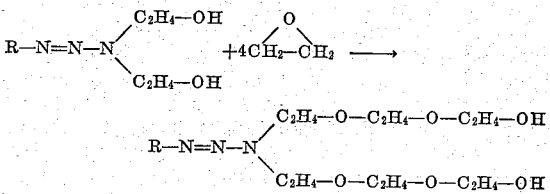

The water-soluble diazoimino compounds obtained by this reaction are of great practical interest due to their hydrolysis with acids to give the diazo again. The process has the unique feature of enabling one to prepare water-soluble diazoimino compounds from water-insoluble diazoimino compounds in the absence of water, thus eliminating the necessity of isolating a very water-soluble product from aqueous solution. It has been demonstrated that not only ethylene oxide itself but a combination which will produce such can be employed. For example, ethylene chlorohydrin and caustic yield a product with the diazoimino from tetrazotized dianisidine and diethanol amine which shows markedly improved solubility.

As many apparently widely different embodiments of this invention may be made without departing from the spirit and scope thereof, it is to be understood that I do not limit myself to the specific embodiments thereof except as defined in the appended claims.

I claim:

1. The process which comprises reacting a diazoimino compound derived from class consisting of diethanol amine and methyl glucamine with ethylene oxide.

2. The process which comprises reacting a secondary alkylol amine with an azotized arylamine, and reacting the azoimino product with ethylene oxide.

3. The process which comprises reacting diethanol amine with an azotized arylamine and reacting the azoimino product with ethylene oxide.

4. The process which comprises reacting a secondary alkylol amine with a tetrazotized diamino compound and reacting the azoamino product with ethylene oxide.

WALLACE A. ERICKSON.